United States Patent [19]

Stournas et al.

[11] 4,113,632

[45] Sep. 12, 1978

[54] OIL RECOVERY BY SURFACTANT WATERFLOODING

[75] Inventors: Stamoulis Stournas, Flemington; El Ahmadi I. Heiba, Princeton, both of N.J.

[73] Assignee: Mobil Oil Corporation, New York, N.Y.

[21] Appl. No.: 770,164

[22] Filed: Feb. 18, 1977

Related U.S. Application Data

[63] Continuation-in-part of Ser. No. 719,135, Aug. 31, 1976, which is a continuation-in-part of Ser. No. 488,885, Sep. 15, 1974, abandoned.

[51] Int. Cl.$^2$ ............................................. E21B 43/22
[52] U.S. Cl. .............................. 252/8.55 D; 166/273; 166/274; 260/326.5 SF; 260/501.21; 260/507 R
[58] Field of Search .................. 252/8.55 D; 166/273, 166/274, 275; 260/501.21, 507 R, 326.5 SF

[56] References Cited

U.S. PATENT DOCUMENTS

| 3,469,630 | 9/1969 | Hurd et al. ...................... 252/8.55 X |
| 3,508,612 | 4/1970 | Reisberg et al. ..................... 252/8.55 |
| 3,732,290 | 5/1973 | Danzik ................................. 260/507 |
| 3,811,504 | 5/1974 | Flournoy et al. .................... 166/273 |
| 3,811,505 | 5/1974 | Flournoy et al. .................... 166/274 |
| 3,858,656 | 1/1975 | Flournoy et al. .................... 166/274 |
| 3,890,239 | 6/1975 | Dycus et al. ..................... 166/274 X |

FOREIGN PATENT DOCUMENTS

1,194,286   6/1970   United Kingdom.

OTHER PUBLICATIONS

Foster, Article in *Journal of Petroleum Technology*, vol. 25, Feb. 1973, pp. 205–210.

*Primary Examiner*—Herbert B. Guynn
*Attorney, Agent, or Firm*—C. A. Huggett; William D. Jackson

[57] ABSTRACT

Waterflooding process for the recovery of oil from a subterranean oil reservoir which involves the injection into the reservoir of an aqueous solution of an aliphatic substituted succinimido aryl hydroxy sulfonate or its corresponding succinamic acid derivative. This surfactant functions to reduce the oil-water interfacial tension and also functions in the presence of divalent metal ions, such as calcium or magnesium, as a thickening agent to increase the viscosity of the injected water. In carrying out the invention in oil reservoirs in which the connate waters exhibit a divalent metal ion concentration of at least 0.2 weight percent, the surfactant may be injected in a relatively fresh water which exhibits a divalent metal ion concentration less than that of the reservoir water. Thus as the surfactant solution mixes with the reservoir water, the divalent metal ion concentration of the solution is increased with an attendant increase in its viscosity.

27 Claims, 2 Drawing Figures

OIL RECOVERY BY SURFACTANT WATERFLOODING

CROSS REFERENCE TO RELATED CASES

This is a continuation-in-part application of application Ser. No. 719,135, filed Aug. 31, 1976, which in turn is a continuation-in-part of application Ser. No. 488,885, filed Sept. 15, 1974 and now abandoned.

BACKGROUND OF THE INVENTION

This invention relates to the recovery of oil from subterranean oil reservoirs and more particularly to improved waterflooding operations involving the use of aliphatic substituted succinimido aryl hydroxy sulfonates and their corresponding succinamic acid derivatives.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the introduction of water into the reservoir through an injection system comprised of one or more wells. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflood. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. Thus far, most low tension waterflooding applications have employed anionic surfactants. For example, a paper by W. R. Foster entitled "A Low-Tension Waterflooding Process", Journal of Petroleum Technology, Vol. 25, Feb. 1973, pp. 205-210, described a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One limitation encountered in waterflooding with certain anionic surfactants such as the petroleum sulfonates is the tendency of the surfactants to precipitate from solution in the presence of even moderate concentrations of divalent metal ions such as calcium and magnesium ions. Another limitation imposed upon the use of such anionic surface-active agents resides in the fact that desired low interfacial tensions can seldom be achieved, even in the absence of divalent metal ions, at salinities significantly in excess of 2 or 3 weight percent.

In view of these limitations, it has been proposed to carry out waterflooding employing surfactant formulations which will tolerate relatively high salinities and concentrations of divalent metal ions. For example, U.S. Pat. No. 3,811,505 to Flournoy et al. discloses a mixture of anionic and nonionic surfactants for use in formations containing water having concentrations of divalent ions such as calcium and magnesium within a range of about 500 to about 9000 parts per million. The nonionic surfactants employed in the Flournoy et al. process include polyethoxylated alkyl phenols in which the alkyl group has 5 to 20 carbon atoms and polyethoxylated aliphatic alcohols having from 5 to 20 carbon atoms. These surfactants are said to contain from 6 to 20 ethylene oxide groups. The anionic surfactants employed include alkyl sulfonates and phosphates having from 5 to 25 carbon atoms and alkylaryl sulfonates and phosphates having from 5 to 25 carbon atoms in the alkyl groups.

U.S. Pat. No. 3,811,504, also to Flournoy et al., is directed to a low tension waterflood process for use in environments exhibiting a divalent metal ion concentration of about 1500 to about 12,000 parts per million and which employs a three-component surfactant system containing two anionic surfactants and one nonionic surfactant. One of the anionic surfactants is an alkyl or alkylaryl sulfonate and the other anionic surfactant is an alkyl polyethoxy sulfate. The nonionic surfactant may be a polyethoxylated alkyl phenol or a polyethoxylated aliphatic alcohol as disclosed in the previously mentioned Flournoy et al. patent or it may take the form of a fatty acid dialkanolamide or a fatty acid monoalkanolamide in which the fatty acid contains from 5 to 20 carbon atoms. In this process as in the previously described Flournoy et al. patent, a thickening agent such as polyacrylamide or polysaccharide may be added to the surfactant slug or to a subsequently injected slug. In addition the surfactant slug may be preceded by a sacrificial agent such as sodium polyphosphate or sodium carbonate.

Yet a further low tension waterflooding technique for use in high salinity and high divalent metal ion environments is disclosed in the aforementioned parent application Ser. No. 719,135. This technique involves the injection of an aqueous solution of an anionic surfactant comprising a hydrocarbyl substituted succinimido aryl sulfonate or its corresponding succinamic acid amide derivative. These surfactants may be employed alone or to stabilize normally brine-sensitive surfactants such as petroleum sulfonates in divalent metal ion concentrations of up to 2,000 parts per million. Particularly suitable as brine stabilizing surfactants are alkyl or alkenyl succinimido aryl disulfonates (and their corresponding succinamic acid derivatives) in which the alkyl or alkenyl substituent contains from 14 to 25 carbon atoms.

SUMMARY OF THE INVENTION

In accordance with the present invention, there is provided a new and improved waterflooding process employing a surfactant which exhibits interfacial activity in relatively saline aqueous environments and which functions as a thickener in the presence of divalent metal ions. The invention is carried out in a subterranean oil reservoir penetrated by spaced injection and production systems. In the practice of the invention, at least a portion of the aqueous fluid injected in the course of waterflooding the reservoir comprises an aqueous solution of an aliphatic substituted succinimido aryl hydroxy sulfonate or its corresponding succinamic acid derivative. A preferred application of the invention is with respect to subterranean oil reservoirs which contain water having a divalent metal ion concentration of at least 0.2 weight percent. The aqueous solution of the aliphatic substituted succinimido aryl hydroxy sulfonate, or its corresponding succinamic acid derivative, is free of divalent metal ions or exhibits a divalent metal ion concentration less than that of the reservoir water.

A preferred surfactant for use in the present invention is selected from the group consisting of an aliphatic substituted succinimido aryl hydroxy sulfonate characterized by the formula

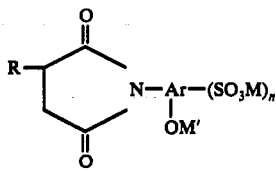
(1)

and its corresponding succinamic acid amide derivative characterized by the formula

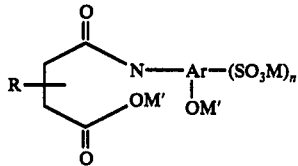
(2)

wherein R is an aliphatic group containing from 8 to 25 carbon atoms,
Ar is a mononuclear or condensed ring dinuclear aryl group,
M is an alkali metal ammonium or substituted ammonium ion,
n is 1 or 2, and
M' is the same as M or hydrogen.

DESCRIPTION OF SPECIFIC EMBODIMENTS

Figure 1:
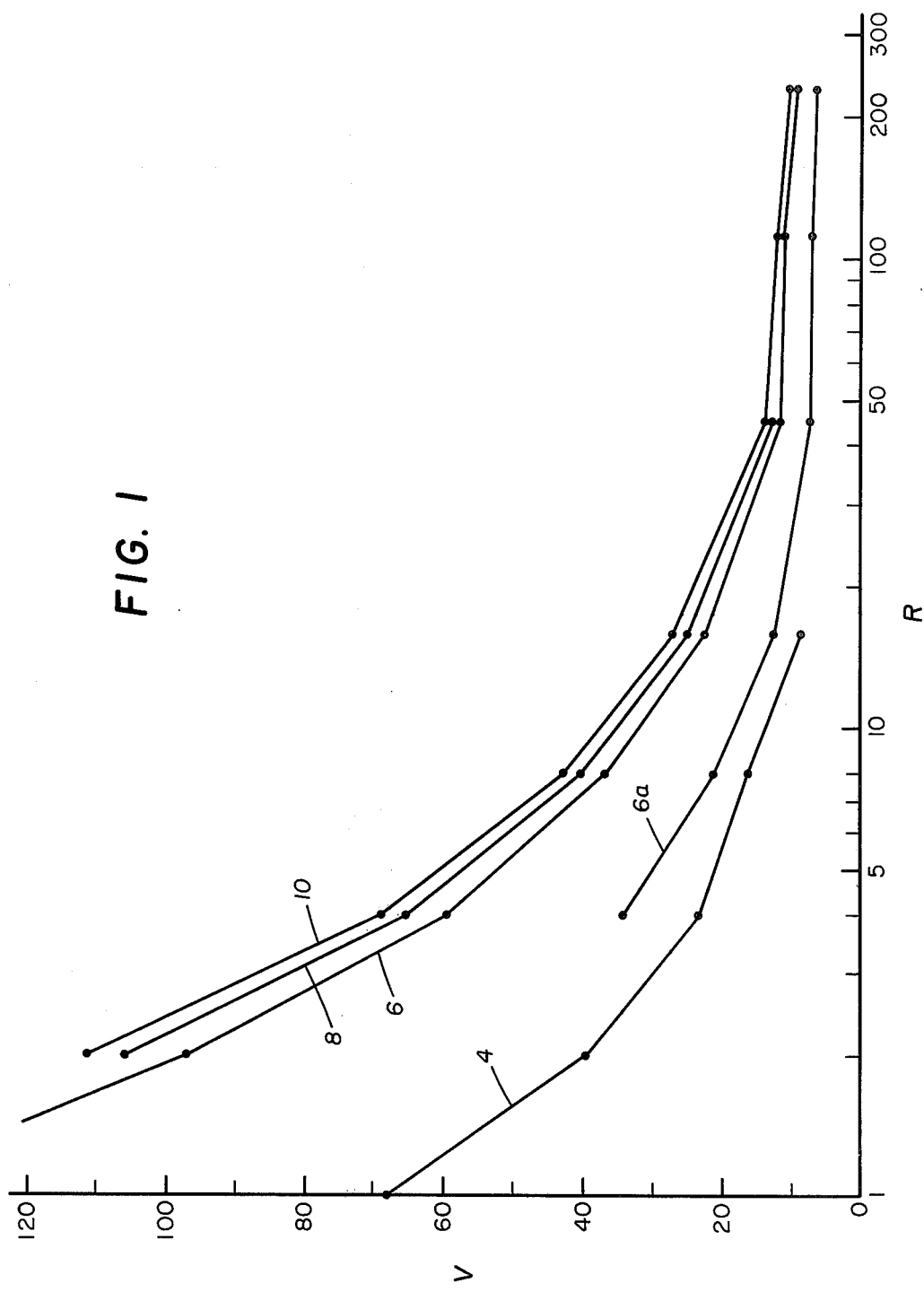
FIG. 1 is a graph illustrating viscosities of various mixed brine surfactant solutions useful in the present invention as a function of shear rate.

This invention relates to waterflooding employing as additives aliphatic substituted succinimido aryl hydroxy sulfonates and their hydrolysis derivatives. These products like the succinimido aryl sulfonates and their acid amide hydrolysis products disclosed in the parent application Ser. No. 719,135 can tolerate relatively high salinities and divalent ion concentrations without precipitation from aqueous solutions. In addition, the hydroxy sulfonates of the present invention exhibit interfacial activities which appear to be largely unaffected by changes in salinity and divalent metal ion concentrations. More importantly however the hydroxy sulfonates of the present invention exhibit unusual water thickening activity in the presence of divalent metal ions, such as the calcium and magnesium ions commonly encountered in subterranean oil-bearing formations.

Aliphatic substituted succinimido aryl hydroxy sulfonates suitable for use in the present invention include those in which the aliphatic substituted succinimido group is linked to a mononuclear or condensed ring dinuclear aryl group, e.g. benzene or naphthalene, which is substituted with one hydroxy group and one sulfonate group where the aryl group is mononuclear and one or two sulfonate groups where the aryl group is dinuclear. In order to impart sufficient interfacial activity to the molecule, the aliphatic substituent on the succinimido group should contain from 8 to 25 carbon atoms. Compounds of this class may be characterized by the formula

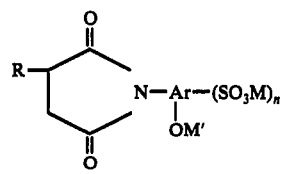
(1)

wherein R is an aliphatic group containing from 8 to 25 carbon atoms,
Ar is a mononuclear or condensed ring dinuclear aryl group,
M is an alkali metal, ammonium, or substituted ammonium ion,
n is 1 where Ar is a mononuclear aryl group and 1 or 2 where Ar is a dinuclear aryl group, and
M' is the same as M or hydrogen.

Where M is an alkali metal ion, it usually will take the form of sodium or potassium. Substituted ammonium ions which may be employed include mono-, di-, or tri-substituted alkyl ammonium or alkanol ammonium ions. Examples of alkyl ammonium ions include methylammonium, ethylammonium, and n- or isopropylammonium ions. Examples of alkanol ammonium ions include monoethanolammonium or triethanolammonium ions. For a description of various other substituted ammonium ions which may be employed, reference is made to the aforementioned parent application Ser. No. 719,135.

The aliphatic substituted succinimido aryl hydroxy sulfonates of the present invention are subject to hydrolysis under alkaline conditions and/or at elevated temperatures in a manner similar to the succinimido aryl sulfonates disclosed in parent application Ser. No. 719,135. The hydrolysis product is the corresponding succinamic acid derivative of the compound of formula (1) and may be characterized by the formula

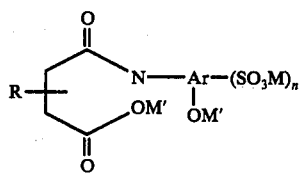
(2)

wherein R, Ar, M, n, and M' are the same as previously described. The hydrolysis reaction described above may be expected to proceed at approximately the same rate as the hydrolysis of the succinimido aryl sulfonates described in parent application Ser. No. 719,135. The rate of hydrolysis may be accelerated somewhat where the hydroxyl group is in close proximity to the succinimido group. For example in the case of a mononuclear aryl compound with the hydroxyl group in the ortho position with respect to the succinimide group, hydrolysis normally will proceed at a somewhat faster rate than in the case where the hydroxyl group is in the meta position. By way of example, at room temperature and at a pH on the order of 9, about one-half of the aliphatic substituted succinimido aryl hydroxy sulfonate characterized by formula (1) will be converted to its corresponding succinamic acid derivative characterized by formula (2) in a matter of several days. At elevated temperatures on the order of 200° F., the rate of hydrolysis normally will be accelerated so that most of the succinimido aryl sulfonate is converted to its corresponding succinamic acid derivative in a matter of several hours. Even at the neutral or near neutral pH conditions encountered in most subterranean oil reservoirs, the hydrolysis reaction can be expected to take place although at a significantly lower rate. Accordingly, injection of the aliphatic substituted succinimido aryl hydroxy sulfonate characterized by formula (1) above will result, because of hydrolysis in the reservoir, in a mixture of the surfactants characterized by formulas (1) and (2).

The aliphatic substituted succinimido aryl hydroxy sulfonates characterized by formula (1) may be synthesized by procedures analogous to those used in preparing the succinimido aryl sulfonates disclosed in parent application Ser. No. 719,135, to which reference is made. Thus the surfactants of the present invention may be prepared by reaction of the appropriate amino aryl hydroxy sulfonic acid in its alkali metal, ammonium, or substituted ammonium form with an aliphatic substituted succinic anhydride having the desired number of aliphatic carbon atoms. The reaction is permitted to proceed at temperature within the range of 140° to 180° C. until one molar equivalent of water is evolved from the reaction mixture which signifies that the reaction is complete.

Examples of amino aryl hydroxy sulfonic acids which may be employed in preparing condensed ring dinuclear aryl monosulfonates include the alkali metal, ammonium, and substituted ammonium salts of 1-amino-2-naphthol-4-sulfonic acid, 1-amino-2-naphthol-6-sulfonic acid, 1-amino-5-naphthol-7-sulfonic acid, 1-amino-8-naphthol-4-sulfonic acid, 1-amino-8-naphthol-5-sulfonic acid, 2-amino-1-naphthol-4-sulfonic acid, 2-amino-3-naphthol-6-sulfonic acid, 2-amino-5-naphthol-7-sulfonic acid, and 2-amino-8-naphthol-6-sulfonic acid.

Examples of precursors which may be employed in preparing the condensed ring dinuclear aryl disulfonate derivatives include the alkali metal, ammonium, and substituted ammonium salts of 1-amino-2-naphthol-3,6-disulfonic acid, 1-amino-8-naphthol-2,4-disulfonic acid, 1-amino-8-naphthol-3,5-disulfonic acid, 1-amino-8-naphthol-3,6-disulfonic acid, 1-amino-8-naphthol-4,6-disulfonic acid, and 2--amino-8-naphthol-3,6-disulfonic acid.

Examples of reactants which may be employed in preparing the mononuclear aryl derivatives include the alkali metal, ammonium, and substituted ammonium salts of 2-amino-1-phenol-4-sulfonic acid, 2-amino-1-phenol-5-sulfonic acid, 3-amino-1-phenol-4-sulfonic acid, and 3-amino-1-phenol-6-sulfonic acid.

The other reactant employed in producing the hydroxy sulfonates characterized by formula (1) may be any suitable aliphatic substituted succinic anhydride having the prescribed number of aliphatic carbon atoms to provide the desired lipophilic base. The aliphatic substituents may be saturated or unsaturated and branched or straight chain. Examples of such aliphatic substituents include octyl, dodecyl, tetradecyl, tetracosyl, dodecenyl, iso-octadecenyl radicals.

While the hydroxy sulfonates characterized by formulas (1) and (2) may be mononuclear or dinuclear, a preferred form of surfactant for use in the present invention is a mononuclear derivative and more specifically a phenyl sulfonate characterized by the formulas:

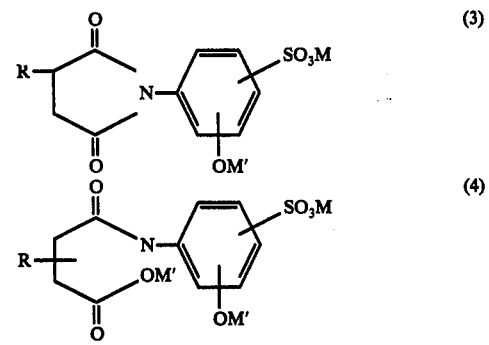

wherein R, M, and M' are as described previously. In a preferred form of the class of surfactants characterized by formulas (3) and (4), the aliphatic group contains from 14 to 22 carbon atoms and more specifically from 16 to 20 carbon atoms in order to enhance the viscosifying effect of the surfactant as indicated by the experimental data described hereinafter. While as indicated by formulas (3) and (4) the sulfonate and hydroxy groups may be at any position on the benzene nucleus, it is preferred that the sulfonate group be in the meta position with respect to the succinimido or succiniamic acid amide group. Further, it is desirable that the sulfonate and hydroxy groups be on non-adjacent carbon atoms in the benzene ring and more specifically that the hydroxy group be in the para position relative to the sulfonate group. surfactants within this class may be characterized by the formulas:

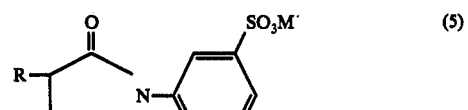

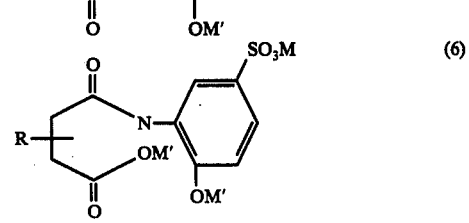

wherein R, M, and M' are as defined above.

The following examples illustrate the preparation of certain aliphatic substituted succinimido aryl hydroxy sulfonates characterized by formula (5) above.

EXAMPLE 1

A mixture was prepared of 21.2 parts by weight of normal octyl succinic anhydride and 24.8 parts by weight of the trimethylamine salt of 2-amino-1-phenol-4-sulfonic acid. This mixture was heated to about 150° C. for about 4 hours, at which time the anhydride peak in the infrared spectrum had disappeared. The resulting trimethylammonium n-octyl succinimido phenol sulfonate was recovered in an amount of 40.2 parts by weight.

EXAMPLE 2

A mixture of 29.6 parts per weight of normal tetradecyl succinic anhydride and 24.8 parts per weight of the trimethylamine salt of 2-amino-1-phenol-4-sulfonic acid was reacted as described in Example 1. The reaction product was allowed to cool to room temperature and was then dissolved in 1000 parts ethanol containing 4 parts sodium hydroxide. The solution was heated under reflux for 1 hour and the ethanol then evaporated off to provide 48 parts by weight of the sodium salt of the tetradecyl derivative.

EXAMPLE 3

Iso-octadecenyl succinic anhydride in an amount of 35 parts per weight was mixed with 24.8 parts per weight of the trimethylamine salt of 2-amino-1-phenol-4-sulfonic acid and reacted as described in Example 2. The resulting sodium salt of the iso-octadecenyl derivative was produced in an amount of 51.5 parts by weight.

EXAMPLE 4

A mixture of 44 parts per weight of polybutenyl (molecular weight 340) succinic anhydride and 24.8 parts per weight of the trimethylamine salt of 2-amino-1-phenol-4-sulfonic acid was reacted as described in Example 2. The product in the sodium form was recovered in an amount of 61 parts by weight.

The following examples illustrate the preparation of monosulfonated and disulfonated naphthol derivatives.

EXAMPLE 5

A mixture of 26.6 parts by weight of dodecenyl succinic anhydride (prepared by the condensation of propylene tetramer and maleic anhydride) and 40 parts by weight of the monosodium monotrimethylamine salt of 7-amino-1-naphthol-3,6-disulfonic acid was reacted as described in Example 1. An amount of 63 parts by weight of the disulfonated product was recovered in the mixed sodium trimethylamine form.

EXAMPLE 6

A mixture of 26.6 parts by weight of dodecenyl succinic anhydride and 29.8 parts by weight of the trimethylamine salt of 8-amino-1-naphthol-5-sulfonic acid was treated as described in Example 2. The resulting monosulfonate in the sodium form was recovered in an amount of 52 parts by weight.

In order to illustrate the thickening effect of the aliphatic substituted succinimido aryl hydroxy sulfonates employed in the present invention, laboratory experiments were carried out to determine the viscosities of aqueous solutions of the surfactants prepared in accordance with Examples 1, 2, 3, and 4, referred to hereinafter as "surfactants S-1, S-2, S-3, and S-4", respectively. The aqueous media employed were mixed brine solutions prepared from a stock mixed brine solution containing 19.3 weight percent sodium chloride, 7.7 weight percent calcium chloride, and 3.0 weight percent magnesium chloride to provide a total salinity of 30 weight percent. This stock solution was mixed with distilled water to form the brines of the various salinities used in the experimental work.

Comparative viscosity data for the surfactants S-1 through S-4 in a 6 percent mixed brine solution are shown in Table I. In Table I, the surfactant concentration in weight percent are given in the second column and the viscosities in centipoises measured at shear rates of 4, 7.9, and 15.8 sec$^{-1}$ are given in the third, fourth, and fifth columns, respectively. The 6 percent mixed brine solution employed contained calcium and magnesium ions in an amount slightly in excess of 7,000 parts per million, or about 0.7 weight percent.

TABLE I

| Surfactant | Concentration | Viscosity | | |
|---|---|---|---|---|
| | | 4 sec$^{-1}$ | 7.9 sec$^{-1}$ | 15.8 sec$^{-1}$ |
| S-1 | .5% | 2.1 | 2.0 | 2.1 |
| S-2 | .5% | 4.1 | 3.3 | 3.0 |
| S-3 | .4% | 59.6 | 36.7 | 22.4 |
| S-4 | .5% | 3.9 | 3.1 | 2.9 |

As can be seen from examination of the data presented in Table I, the normal octyl derivative showed a slight thickening in the 6 percent mixed brine solution with no discernible shear thinning characteristic. The normal tetradecyl and polybutene derivatives exhibited a somewhat greater thickening action and a shear thinning effect is discernible. The iso-octadecenyl derivative showed a very strong thickening action although in a somewhat lower concentration than the other three surfactants, and the shear thinning effect is quite pronounced.

Certain of the data presented in Table I along with additional viscosity measurements carried out with regard to the surfactant S-3 are presented in FIG. 1 in which the curves shown are graphs of the viscosity, V, in centipoises plotted on the ordinate versus the log of the shear rate, R, in sec$^{-1}$ plotted on the abscissa. In FIG. 1, curves 4, 6, 8, and 10 are viscosity measurements obtained for a 0.4 weight percent solution of the surfactant S-3 in mixed brines of 4, 6, 8, and 10 weight percent, respectively. Curve 6a in FIG. 1 is a graph of the viscosities observed for a 0.3 weight percent solution of surfactant S-3 in a 6 percent mixed brine solution. The divalent ion concentrations present in the various mixed brine solutions corresponding to curves 4, 6, 8, and 10 ranged from a low of 4,729 parts per million for the 4 percent mixed brine to 11,822 parts per million for the 10 percent mixed brine.

It will be recognized from the data presented in FIG. 1 that the thickening action of the aliphatic substituted succinimido aryl hydroxy sulfonates of the present invention varies not only with surfactant concentration but also with the amount of divalent metal ions in solution. A significant increase in viscosity is observed between the 4 and 6 percent mixed brine solutions with correspondingly less increases between the 6 and 8 percent and 8 and 10 percent mixed brine solutions.

In addition to functioning as thickening agents to increase the macroscopic displacement efficiency of the reservoir oil by the injected flooding water, the hydroxy sulfonates employed in the present invention also function to decrease the interfacial tension between the reservoir oil and the injected water thus increasing the microscopic displacement efficiency. While in theory any decrease of oil-water interfacial tension will result in a better microscopic displacement of the reservoir oil by the injected water, it is desirable that the oil-water interfacial tension be reduced to a value of 0.1 dyne per centimeter or less in order to achieve a significant increase in microscopic displacement efficiency. It is preferred that the interfacial tension be reduced to a value of 0.005 dyne/cm or less in order to arrive at optimum conditions for microscopic displacement efficiency. As indicated previously, many anionic surfactants which function to decrease oil-water interfacial tension are adversely affected by even small quantities of divalent metal ions. Typically for such surfactants, the divalent metal ion concentration should be less than about 50 parts per million and if it exceeds 300 to 500 parts per million, the use of such anionic surfactants alone is usually ineffective.

Figure 2:
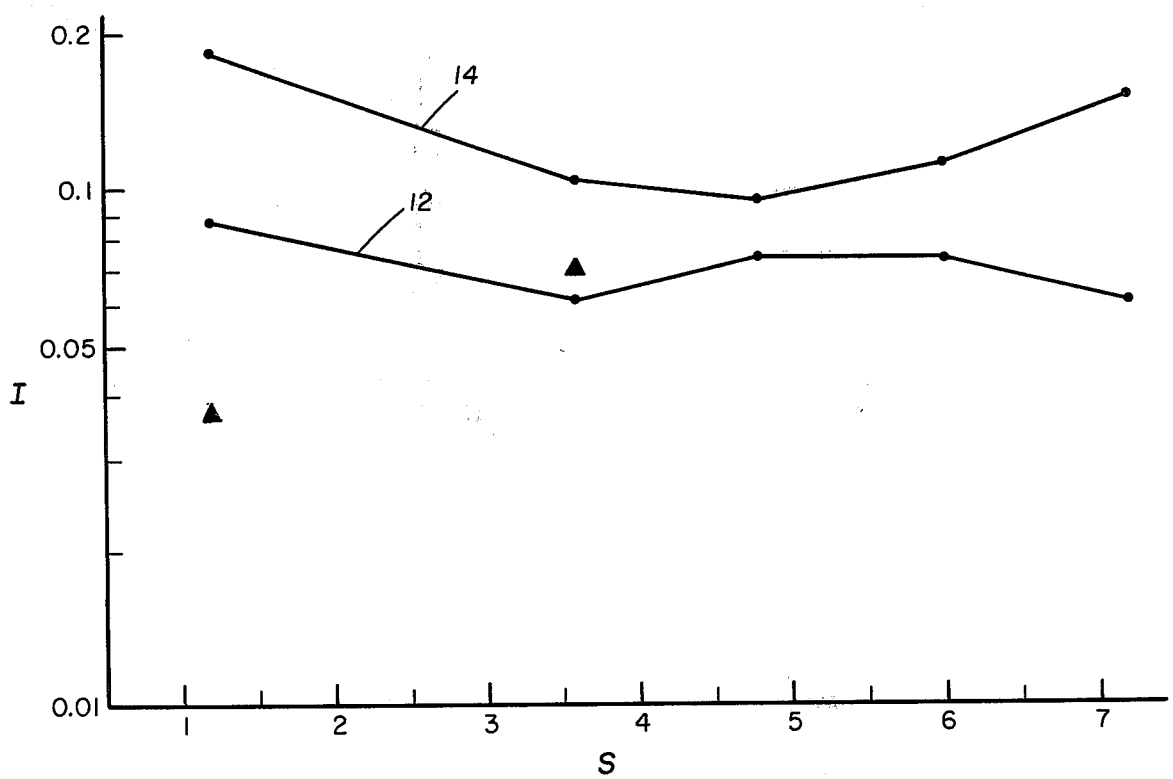
FIG. 2 is a graph illustrating interfacial tensions observed between oil and various mixed brines containing a surfactant employed in carrying out the present invention.

The interfacial activity of the hydroxy sulfonates used in the present invention appears to be only moderately affected by the presence of divalent ions. In this respect, FIG. 2 illustrates the results of interfacial tension measurements against a crude oil for aqueous solutions of the iso-octadecenyl succinimido phenol sulfonate produced in accordance with Examples 3. In this set of experiments, interfacial tension measurements were taken by the microsessile drop technique for a surfactant concentration of 0.08 weight percent in mixed brines of 1.2, 3.6, 4.8, 6, and 7.2 weight percent. The mixed brines were prepared from the stock solution as described previously, thus the divalent ion concentration ranged from about 1400 parts per million for the 1.2 percent mixed brine to about 8500 parts per million for the 7.2 percent mixed brine.

In FIG. 2 the log of interfacial tension, I, in dynes per centimeter is plotted on the ordinate versus the total salinity, S, of the mixed brine solution on the abscissa. Curve 12 of FIG. 2 indicates the interfacial tensions observed for fresh surfactant solutions by measuring the oil drops in the microsessile drop technique within one hour after they were formed. Curve 14 indicates the interfacial tensions observed by measuring the same oil drops after standing for 16 hours. Also shown in FIG. 2 are data points indicated by the legend ▲ which show the interfacial tensions observed for aqueous solutions of the surfactant which were aged for approximately 3 months with the measurements taken within one hour after drop formation. It will be recognized that in the fresh solutions depicted by curves 12 and 14 the hydroxy sulfonate surfactant was present substantially in the succinimido form with little or no hydrolysis product present. In the aged solutions indicated by data points ▲, the surfactant was comprised of a mixture of the succinimido and hydrolyzed succinamic acid derivatives with the latter probably predominating.

From an examination of the data presented in FIG. 2, it can be seen that the presence of divalent metal ions exhibits little or no effect on the interfacial activity of the hydroxy sulfonate surfactants. Further, it would appear that aging of the surfactant solution with the attendant conversion of the succinimido form to the acid amide form would not appear to have any deleterious effect and may, in fact, prove beneficial.

Laboratory oil displacement tests were carried out for the surfactant S-3 in mixed brine solutions of 6 percent and 10.5 percent. The linear displacement experiments were carried out in 3-foot long tubes having an internal diameter of 11/32 inch and packed with Berea sand. The sand packed tube was first flooded with saline water (1 weight percent sodium chloride) and then flooded with a crude oil until the effluent from the tube contained no water in order to arrive at an initial oil saturation. Thereafter the tube was flooded with the previously described saline solution until the effluent from the tube contained no oil in order to arrive at a residual oil saturation after waterflood. Thereafter the surfactant slug was injected in each case in an amount of 0.6 pore volume. In one run employing 0.5 weight percent of the surfactant S-3 in 10.5 weight percent mixed brine, a tertiary oil recovery of 13.6 percent was achieved. In this case, the surfactant slug was driven through the tube with a 1 percent sodium chloride solution. In the other tube run employing 0.4 weight percent of the surfactant S-3 in 6 percent mixed brine, the 0.6 pore volume surfactant slug was driven through the tube by 0.5 weight percent sodium chloride solution containing 1,000 parts per million Kelzan and 50 parts per million of a bactericide. In this case the tertiary oil recovery was 36.5 percent.

In order to achieve a thickening effect through the use of hydroxy sulfonates in accordance with the present invention, the surfactants should be employed in an environment in which the divalent metal ion concentration is within the range of 0.2–1.5 weight percent. While viscosity measurements were not made for mixed brine solutions above 10 percent, a 0.4 weight percent solution of surfactant S-3 in 12 percent mixed brine showed signs of slight precipitation. Accordingly, a preferred divalent metal ion concentration is within the range of 0.5–1.2 weight percent.

The hydroxy sulfonate surfactant may be employed in any suitable amount, depending upon the desired viscosity of the injection water and also the characteristics of the reservoir involved. Because of the radial flow geometry associated with the flow of fluid to or from a well, the flow velocity and thus the shear rate are extremely high immediately adjacent the well and relatively low at the more remote locations in the reservoir. Typically the shear rate in the intermediate portion of the reservoir between the injection and production wells will be on the order of 1 or 2 $sec^{-1}$ and in the more permeable zones of the reservoir may range up to perhaps 10 $sec^{-1}$. It normally will be desirable to employ the hydroxy sulfonate surfactant in a sufficient concentration to increase the viscosity of the water to a value at least equal to that of the reservoir oil under the reservoir conditions and shear rates involved. Typically it will be desirable to provide a water viscosity within the range of 1 to 4 times the viscosity of the reservoir oil.

It will be recalled from the data presented in FIG. 1 that the viscosity of the aqueous surfactant solution depends upon the surfactant concentration as well as with divalent metal ion concentration. Also the thickening power of the hydroxy sulfonate surfactants of the present invention varies with the number of aliphatic carbon atoms with the greatest thickening action and also the most pronounced shear thinning effect occurring for the derivatives containing about 18 aliphatic carbon atoms. Thus by way of example, with all other conditions being equal, the surfactant S-3 would normally be employed in a much lower concentration than the surfactant S-2 in order to achieve a desired viscosity. Similarly the surfactant would be employed in a lower concentration in a reservoir containing water having a high concentration of divalent ions than in a similar reservoir in which the water contained a smaller amount of divalent ions. In general the hydroxy sulfonate surfactants of the present invention will be employed in concentrations within the range of 0.05-2.0 weight percent. In most cases it will be preferred to employ a surfactant concentration within the range of 0.2-1.0 weight percent.

The hydroxy sulfonates of the present invention may be employed in injection waters containing sufficient amounts of divalent metal ions to cause the surfactant to act as a thickener. However, a preferred mode of carrying out the invention in subterranean formations in which connate waters exhibit a divalent metal ion concentration of 0.2 weight percent or more is to inject the surfactant in a relatively fresh aqueous medium which is either free of divalent metal ions or, if it contains such ions, exhibits a divalent metal ion concentration less than that of the reservoir water. Thus as the surfactant solution is injected and mixes with the reservoir water, the divalent metal ion concentration of the surfactant slug is increased with an attendant increase in viscosity. Normally the divalent metal ion concentration of the reservoir water should not be in excess of 1.5 weight percent although somewhat higher concentrations may be tolerated since diffusion between the injected water and reservoir water will result in a lower divalent metal ion concentration in the presence of the hydroxy sulfonate surfactant. A preferred application of the invention is in reservoirs containing waters having a divalent metal ion concentration within the range of 0.5-1.2 weight percent. The injected aqueous solution of hydroxy sulfonate surfactant should exhibit a divalent metal ion concentration of less than 0.2 weight percent for reasons noted previously.

While the equeous solution of aliphatic succinimido aryl hydroxy sulfonate or its succinamic acid derivative may be employed as the sole displacing fluid, it will usually be injected as a discrete slug and then followed by a driving fluid. Preferably, the aqueous surfactant solution is injected in an amount of at least 0.05 pore volume. Typically the size of the surfactant slug will be within the range of 0.1 to 1.0 pore volume. Thereafter a driving fluid is injected in order to displace the previously injected fluids through the formation. The driving fluid typically may be any water which is locally available and is not incompatible with the formation. The driving fluid is injected in such amount as necessary to carry the recovery process to its conclusion.

The hydroxy sulfonate surfactants of the present invention may also be employed in conjunction with other additives which are not inconsistent therewith. For example the hydroxy sulfonate slug may also contain a second surfactant if it is desired to achieve lower interfacial tensions than that attainable by the hydroxy sulfonate along. Also if desired the surfactant slug may contain or be preceded by sacrificial agents to reduce surfactant adsorption.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein, it is meant that volume of the portion of the formation underlying the well pattern employed, as described in greater detail in the Burdyn et al. patent.

We claim:

1. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of a surfactant selected from the group consisting of an aliphatic substituted succinimido aryl hydroxy sulfonate characterized by the formula

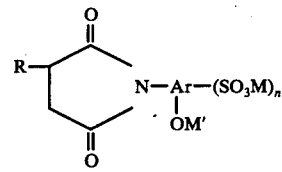

and its corresponding succinamic acid amide derivative characterized by the formula

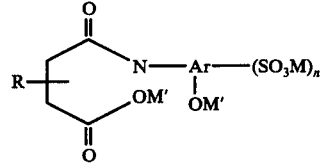

wherein R is a lipophilic aliphatic group containing from 8 to 25 carbon atoms,

Ar is a mononuclear or condensed ring dinuclear aryl group,

M is an alkali metal ammonium or substituted ammonium ion, n is 1 or 2, and

M' is the same as M or hydrogen.

2. The method of claim 1 wherein said subterranean oil reservoir contains water having a divalent metal ion concentration at least 0.2 weight percent.

3. The method of claim 1 wherein said subterranean oil reservoir contains water having a divalent metal ion concentration of at least 0.2 weight percent and said aqueous solution is free of divalent metal ions or exhibits a divalent metal ion concentration less than that of said reservoir water.

4. The method of claim 3 wherein the divalent metal ion concentration of said aqueous solution is less than 0.2 weight percent and the divalent metal ion concentration of said reservoir water is within the range of 0.2-1.5 weight percent.

5. The method of claim 4 wherein the divalent metal ion concentration of said reservoir water is within the range of 0.5-1.2 weight percent.

6. The method of claim 1 wherein R contains from 14-22 carbon atoms and n is 1.

7. The method of claim 6 wherein R contains from 16-20 carbon atoms.

8. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of a surfactant selected from the group consisting of an aliphatic substituted succinimido aryl hydroxy sulfonate characterized by the formula

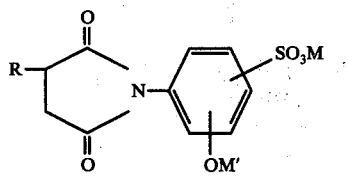

and its corresponding succinamic acid amide derivative characterized by the formula

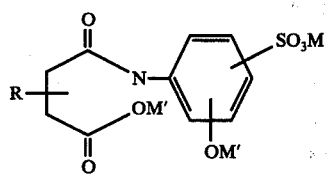

wherein R is a lipophilic aliphatic group containing from 8 to 25 carbon atoms,

M is an alkali metal ammonium or substituted ammonium ion, and

M' is the same as M or hydrogen.

9. The method of claim 8 wherein said subterranean oil reservoir contains water having a divalent metal ion concentration of at least 0.2 weight percent.

10. The method of claim 8 wherein said $SO_3M$ group is in the meta position with respect to said succinimido or said succinamic acid amide group.

11. The method of claim 10 wherein R contains from 14–22 carbon atoms.

12. The method of claim 10 wherein R contains from 16–20 carbon atoms.

13. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of a surfactant selected from the group consisting of an aliphatic substituted succinimido aryl hydroxy sulfonate characterized by the formula

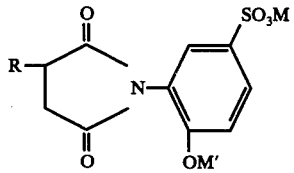

and its corresponding succinamic acid amide derivative characterized by the formula

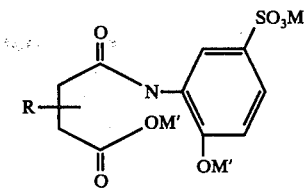

wherein R is a lipophilic aliphatic group containing from 14 to 22 carbon atoms, M is an alkali metal, ammonium or substituted ammonium ion, and M' is the same as M or hydrogen.

14. The method of claim 13 wherein said subterranean oil reservoir contains water having a divalent metal ion concentration of at least 0.2 weight percent.

15. The method of claim 13 wherein R contains from 16–20 carbon atoms.

16. The method of claim 13 wherein R contains 18 carbon atoms.

17. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of an aliphatic substituted succinimido aryl hydroxy sulfonate characterized by the formula

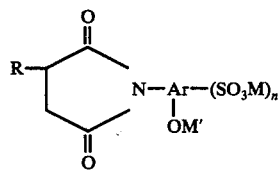

wherein R is a lipophilic aliphatic group containing from 8 to 25 carbon atoms,

Ar is a mononuclear or condensed ring dinuclear aryl group,

M is an alkali metal ammonium or substituted ammonium ion, n is 1 or 2, and

M' is the same as M or hydrogen.

18. The method of claim 17 wherein R contains from 14–22 carbon atoms and n is 1.

19. The method of claim 18 wherein R contains from 16–20 carbon atoms.

20. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of an aliphatic substituted succinimido aryl hydroxy sulfonate characterized by the formula

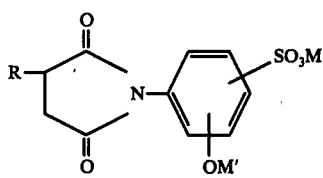

wherein R is a lipophilic aliphatic group containing from 8 to 25 carbon atoms,

M is an alkali metal, ammonium or substituted ammonium ion, and

M' is the same as M or hydrogen.

21. The method of claim 20 wherein said SO₃M group is in the meta position with respect to said succinimido group.

22. The method of claim 21 wherein R contains from 14–22 carbon atoms.

23. The method of claim 21 wherein R contains from 16–20 carbon atoms.

24. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous solution of an aliphatic substituted succinimido aryl hydroxy sulfonate characterized by the formula

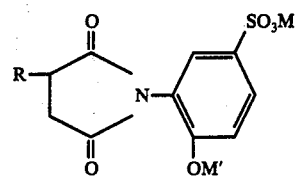

wherein R is a lipophilic aliphatic group containing from 14 to 22 carbon atoms, M is an alkali metal ammonium or substituted ammonium ion, and M' is the same as M or hydrogen.

25. The method of claim 24 wherein R contains from 16–20 carbon atoms.

26. The method of claim 24 wherein R contains 18 carbon atoms.

27. The method of claim 24 wherein said aqueous solution of aliphatic substituted succinimido aryl hydroxy sulfonate contains the corresponding succinamic acid amide derivative characterized by the formula

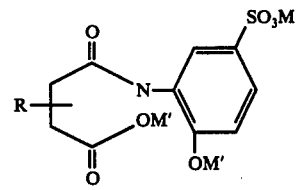

wherein R, M, and M' are as defined in claim 24.

* * * * *